United States Patent [19]

Glenn et al.

[11] 4,392,196

[45] Jul. 5, 1983

[54] MULTI-PROCESSOR TIME ALIGNMENT CONTROL SYSTEM

[75] Inventors: Raymond R. Glenn; David Bell, both of Palm Bay, Fla.

[73] Assignee: Harris Corporation, Melbourne, Fla.

[21] Appl. No.: 176,798

[22] Filed: Aug. 11, 1980

[51] Int. Cl.³ .............................................. G06F 1/00
[52] U.S. Cl. ................................................... 364/200
[58] Field of Search ... 364/200 MS File, 900 MS File; 370/100, 103

[56] References Cited

U.S. PATENT DOCUMENTS

| | | | |
|---|---|---|---|
| 3,602,900 | 8/1971 | Delaigue | 364/200 |
| 3,761,884 | 9/1973 | Avsan | 364/200 |
| 3,810,119 | 5/1974 | Zieve | 364/200 |
| 3,921,149 | 11/1975 | Kreis | 364/200 |
| 3,932,843 | 1/1976 | Trelut et al. | 364/200 |
| 4,077,058 | 2/1978 | Appell et al. | 364/200 |
| 4,084,228 | 4/1978 | Dufond et al. | 364/200 |

*Primary Examiner*—Mark E. Nusbaum
*Assistant Examiner*—Michael R. Fleming
*Attorney, Agent, or Firm*—Antonelli, Terry & Wands

[57] ABSTRACT

In multiprocessor systems, and especially in multiprocessor emulation systems, time alignment between the individual processors is accomplished by using a time window established in a Local Pseudo-Time Accumulator (LPA) at each processor and a time reference hereinafter referred to as Master Pseudo Time (MPT). During the run time, any processor which is within the time frame of the window may continue execution. Any processor which falls behind the window must halt the advance of the Master Pseudo Time untl the processor can execute long enough to move back into the window. Any processor which moves ahead of the window must enter an idle state until the Master Pseudo Time advances enough for the processing element to move back into the window.

22 Claims, 4 Drawing Figures

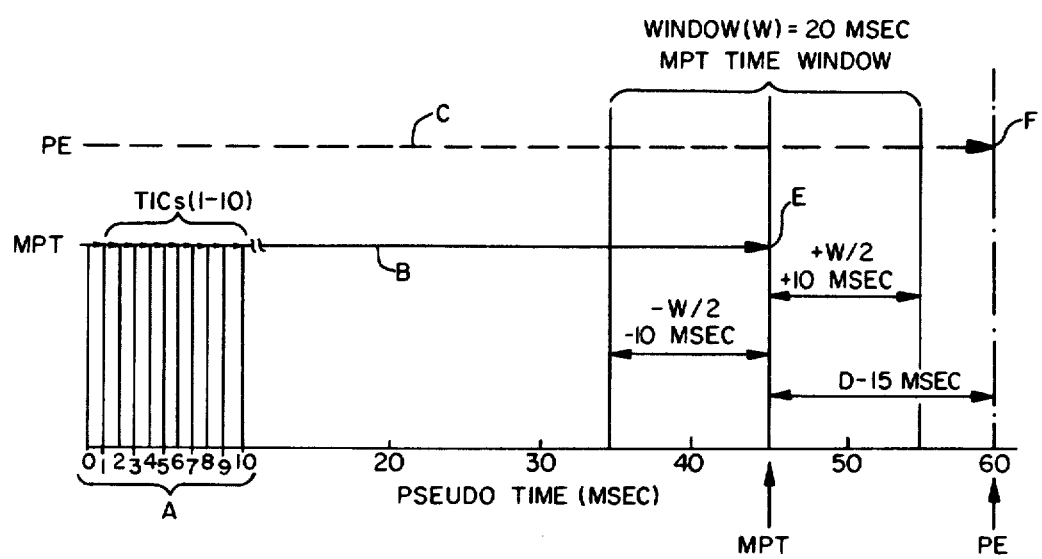

MULTI-PROCESSOR TIME ALIGNMENT CONTROL SYSTEM

The U.S. Government has rights in this invention pursuant to contract number F30602-78-C-0114 awarded by the Department of Defense.

FIELD OF THE INVENTION

This invention relates generally to multiprocessors, and, more particularly, to time alignment of individual processing elements in a multiprocessor emulation system.

BACKGROUND OF THE INVENTION

The rapid growth of computer technology has, in recent years, led to the development of multiprocessor systems for expanding the operational capabilities of computers to an even higher point than that previously available. Basically, such multiprocessors are processing systems which comprise a plurality of individual processors coupled together into a common system so that more than one processing operation can be performed at a time. Because of the enhanced performance in processing available with such multiprocessors, systems are now being developed to utilize large numbers of individual processors together for forming multiprocessor systems with extremely high operational capabilities at relatively low cost.

Although such large scale multiprocessing systems offer the potential of tremendous processing capability, the actual interconnection of large numbers of individual processors presents system designers with various inter-operational difficulties which must be resolved. This is necessary so that the particular processors utilized to operate in conjunction with one another can, in fact, smoothly and effectively carry out the designed multiprocessor operation. Unfortunately, the cost and difficulty of doing this with the actual processors to be used in the final multiprocessor system can be significant.

To make the design and problem solving of such multiprocessing systems easier, it is possible to utilize a model multiple microprocessor system. Such a model microprocessor system has a plurality of emulators, each of which is an emulation processor which can represent the processors in a desired multiprocessor system being modeled. Thus, by studying the behavior of the emulators and changing parameters in the model multiple microprocessor system, it is possible to determine problems which the actual multiprocessor will have ahead of time. Therefore, design changes in the actual multiprocessor can be made to minimize or eliminate such problems ahead of time.

One difficulty which arises in the use of such a model multiple microprocessor system is that when older processing units are being emulated, the emulating processors themselves will be faster than the processors which they are emulating. On the other hand, the opposite problem can develop if the emulators are actually slower than the processors which they are emulating. These problems can result in a loss of fidelity of the emulation.

SUMMARY OF THE INVENTION

Accordingly, it is an object of the present invention to provide an improved multiprocessor emulation system.

Another object of the present invention is to provide an improved multiprocessor emulation system which can account for the different operational times of individual emulation processors in a multiprocessor emulation system.

It is a further object of the present invention to provide a system for time aligning a plurality of processors in a multiprocessor system or a multiprocessor emulation system to account for the different operational times of the processors.

To achieve these and other objects, the present invention provides a system and a method for time aligning individual processing elements in a multiprocessor system to one another. This time alignment is accomplished by using a time window and a time reference hereinafter referred to as Master Pseudo-Time (MPT). During the run time, any processing elements which are within the time frame of the window may continue execution. Any processing element which falls behind the window must halt the advance of the Master Pseudo-Time until the processing element can execute long enough to move back into the window. Any processing element which moves ahead of the window must enter an idle state until the Master Pseudo-Time advances enough for the processing element to move back into the window.

BRIEF DESCRIPTION OF THE DRAWINGS

These and other aims, features and advantages of the present invention will become more apparent from the following description when taken in conjunction with the accompanying drawings which show, for purposes of illustration only, one embodiment in accordance with the present invention and wherein:

FIG. 4 is a timing diagram showing the relationship, in pseudo time, between the advance of master pseudo time and the time wise advance of a processing element.

DETAILED DESCRIPTION OF THE DRAWINGS

Figure 1:
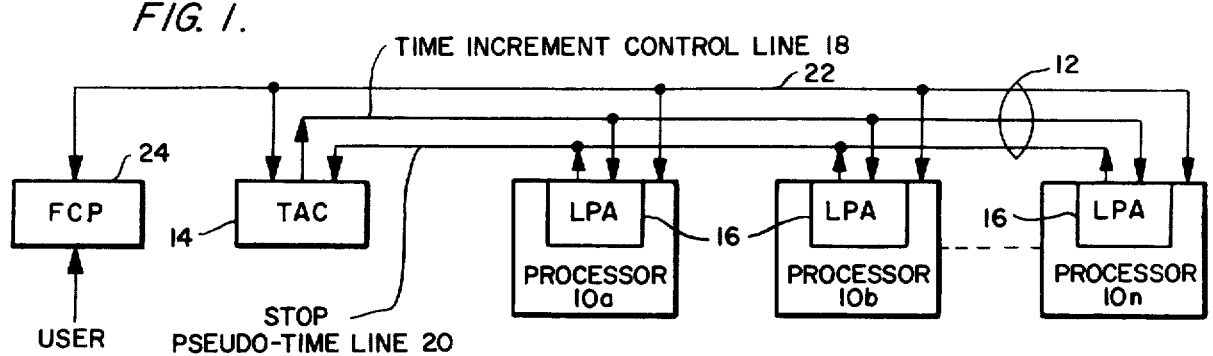
FIG. 1 is a block diagram showing the connection of elements for time alignment in a multiprocessor emulation system in accordance with the present invention.

Referring now to FIG. 1, a Time Alignment Control system is shown in accordance with the present invention for providing time alignment between a number of emulation Processing Elements 10 (hereinafter referred to as PE's 10) of a multiprocessor emulation system. The PE's 10 are shown as located along a common Synchronous Bus System 12. Time alignment is provided between the PE's 10 by the relationship between a Time Alignment Controller 14 (hereinafter referred to as TAC 14) and Local Pseudo Time Accumulators 16 (hereinafter referred to as LPA 16) located at each PE 10.

The TAC 14 is a source of Master Pseuso Time (MPT) for the emulation PE's 10. In particular, the TAC 14 generates Time Increment Control Signals (hereinafter referred to as TICS) along a time increment control line 18 coupled to each PE 10. Another line 20, called the Stop Pseudo Time line (SPT) is also coupled between the PE's 10 and the TAC 14. Lines 18 and 20 are "wired or" lines and are part of the Synchronous Bus System 12 linking the PE's in the multiprocessor system together. In addition to lines 18 and 20, the Synchronous Bus System includes at least one additional line 22 for coupling the PE's 10 to one another and to a Facility Control Processor 24 for intercommunication. The TAC 14 is also coupled to the Facility Control Processor 24. Effectively, the Facility Control Processor 24 is a user interface for allowing a user to communicate commands to either the TAC 14 ot the PE's 10 in their respective LPAs 16.

In operation, the TAC 14 issues TICS to the PE's 10 along the Time Increment Control line 18. This serves to provide a reference to the LPAs 16 for establishing time alignment with the TAC 14. Specifically, the TICS serve as a basis for the generation of an accumulated pseudo time base in the LPAs 16 for comparison with the amount of time which each PE 10 requires for performing the particular macro instruction it is presently involved in. The difference between the accumulated pseudo-time base and the amount of time necessary for the PE 10 to perform a macro instruction is compared with a time window which has been preset in the LPA.

Based on the comparison of the time window with the time difference between the local pseudo time and the time for performing macro instructions, an LPA 16 will determine whether the time for the PE 10 is within the window or ahead or behind it. If the time for performing execution is within a time window, the PE will be allowed to continue normal operation. However, if the time for executing the macro instructions for a given PE is out of the time window, a control operation is performed by the LPA 16 associated with the out-of-alignment PE 10. Specifically, if a PE 10 is ahead of the time window, the LPA 16 will instruct that PE to enter an idle state temporarily. This allows the Master Pseudo Time (MPT) to catch up with the PE 10. If, on the other hand, a given PE 10 is behind the MPT, the LPA 16 will issue a stop order along the Stop Pseudo Time line 20. This will serve to stop the TAC 14 from issuing any more TICS until the PE can advance in pseudo time to align itself with the TAC 14 and thus the other PE's in the multiprocessor emulator. Once realigned, the PE will release the Stop Pseudo Time line 20 and allow the TAC 14 to again begin generating TIC signals.

Figure 2:
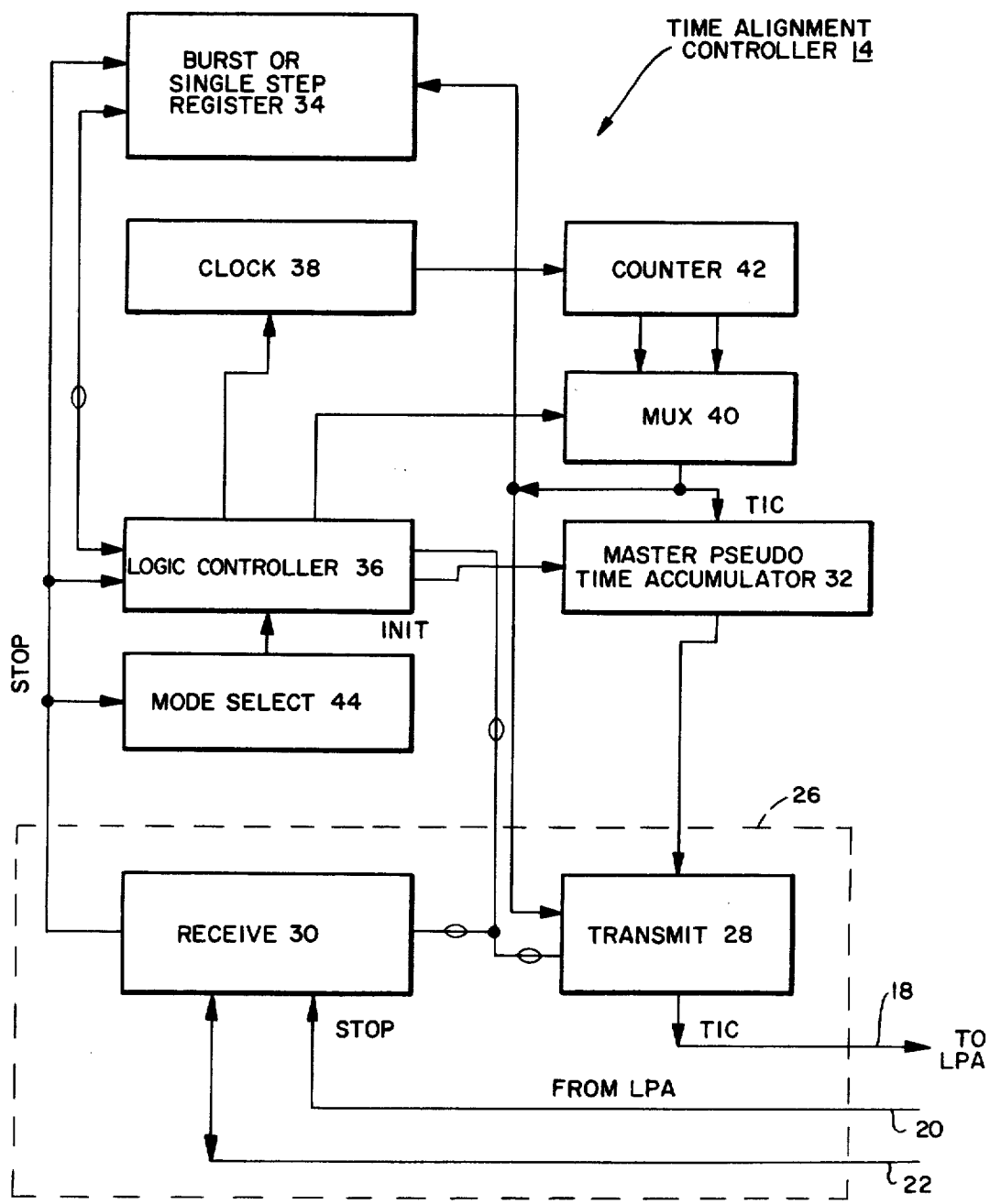
FIG. 2 is a block diagram showing the details of the Time Alignment Controller (TAC) of FIG. 1.

A detailed view of the TAC 14 of FIG. 1 is shown in FIG. 2. As can be seen in FIG. 2, the TAC 14 is coupled to the Synchronous Bus System 12 through a Bus Interface Unit (BIU) 26. In particular, the Bus Interface Unit 26 is comprised of a Transmitter 28 for sending TIC signals to PE's over a Time Increment Control line 18. Similarly, the Bus Interface Unit 26 includes a Receiver 30 for receiving stop signals from PE's 10 over a Stop Pseudo Time line 20. Also, the Receiver 30 will receive user command signals from the Facilities Control Processor over line 22.

Inputs to the PAC Transmitter 28 are provided by a Master Pseudo Time Accumulator 32 and a burst or single-step Register 34. These elements 32 and 34 provide TIC signals to the TAC Transmitter 28 under the control of Logic Controller 36 which is coupled thereto. Logic Controller 36 is also coupled to the TAC Transmitter 28 and the TAC Receiver 30 to control their operation. In addition, the Controller 36 is coupled to a Clock 38 and a Multiplexer 40, which latter circuits are interconnected by a Counter 42. A Mode Selection Switch 44 is coupled to provide mode control for the TAC 14 in a manner described hereinafter. It should be noted that the TAC Receiver 30 is coupled to the Mode Selection Switch 44, the Controller 36, and the burst and single-step Register 34 to provide either a stop signal to them from a PE 10 or a mode selection based on a signal from the Facility Control Processor 24.

In operation, the TAC 14 can operate in one of the following four modes:

Mode 1: free run at maximum rate—continuously issue TIC signals unless a stop is sent via the Stop Pseudo Time line 20.

Mode 2: free run at slow rate—continuously issue TIC signals at a lower rate unless a stop signal is sent via the Stop Pseudo Time line 20.

Mode 3: burst mode—issue a specified number of TIC signals and stop.

Mode 4: single step—issue a single TIC on command from the Facility Control Processor.

Selection of these modes can be accomplished by the Mode Selection Switch 44 in conjunction with the Controller 36 and commands from the user through the Facility Control Processor 24. Modes 1 and 2 are carried out through the utilization of the Clock 38, Counter 42, Multiplexer 40, and Master Pseudo Time Accumulator 32. Specifically, upon command from the Controller 38 in accordance with the Mode Selection Switch 44, the Clock 38 will be triggered to feed clock pulses to a Counter 42. The Counter 42 is provided with two outputs which represent different stage of the counting. Preferably, the Counter 42 is a ring-around counter which will produce the pair of output signals by counting a predetermined number of clock pulses until the last stage is reached. Then the Counter 42 will return to the first stage and begin counting again. In this way, pairs of pulses will be continuously generated.

The Multiplexer 40 receives the two counter outputs, and, in accordance with the command from the Controller 36 based on the mode selected, will determine which count output to use to produce an output signal to the Master Pseudo Time Accumulator 32. This multiplexor output is a TIC signal. Depending on which counter output is chosen by the Multiplexer 40, either a fast TIC rate (Mode 1) or a slow TIC rate (Mode 2) can be achieved.

The TIC signals in Modes 3 and 4 for the TAC 14 are generated utilizing the burst or single-step Register 34. Specifically, upon command from the Controller 36 in accordance with the Mode Selection Switch 44, the Register 34 will provide the desired Mode 3 or 4 output to the Transmitter 28.

The Master Pseudo Time Accumulator 32 is coupled to receive all of the TIC signal to maintain the Master Pseudo Time through accumulating the total number of TIC signals by virtue of being coupled both to the output of the multiplexer and the burst or single-step Register 34.

Figure 3:
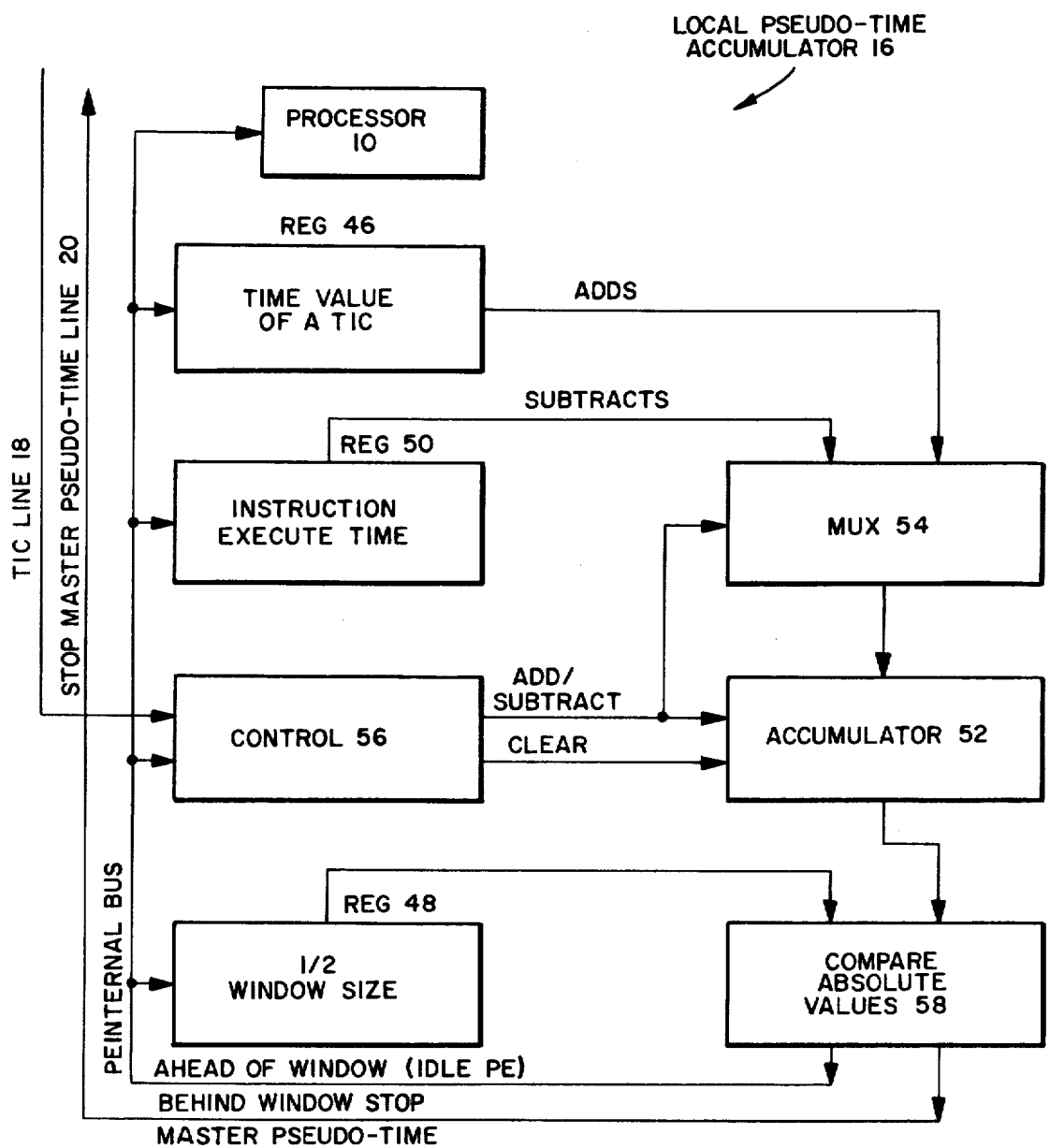
FIG. 3 is a block diagram showing the details of the Local Pseudo Time Accumulator (LPA) of FIG. 1.

The LPA Unit 16 of FIG. 1 is shown in detail in FIG. 3. In accordance with the preferred embodiment of the present invention, the LPA Unit 16 includes first, second and third Registers 46, 48 and 50 and an Accumulator 52. The first and third Registers 46 and 50 are coupled to the Accmulator 52 through a Multiplexer 54. Control of the entry of information from the Registers 46 and 50 into the Accumulator 52 through the Multiplexer 54 is achieved by the LPA Controller 56 which is coupled to both the Multiplexor 54 and the Accmulator 52. The output of the accumulator is coupled to an Absolute Value Comparator 58 for comparison with the stored value in the second Register 48 which is also coupled to said Comparator. All three Registers 46, 48 and 50 and the LPA Controller 56 are connected to the PE 10 along a PE Internal Bus 60 to receive register setting signals and control signals. The LPA Control Circuit 56 is also coupled to the Time Increment Control line 18 to receive TIC signals from the TAC 14.

In a manner described hereinafter, the above-described circuit elemnts of the LPA 16 serve to determine if the PE 10 to which the LPA is connected is within the time window or ahead or behind it. This information is reflected by the output of the Comparator 58. To this end, the Comparator 58 is connected to the PE Internal Bus 60 to place the PE in an idle state if the PE is ahead of Master Pseudo Time MPT. The Comparator 58 is also coupled to the Stop Pseudo Time line 20 to send a stop pulse to the TAC 14 if the PE is behind the MPT.

In operation, the first Register 46 is loaded during system initialization and is used by the operator to define a time value which will be fed into the Accumulator 52 each time a TIC signal is received. As discussed later, the value stored in this Register 46 affects how fast the time window appears to be moving in Master Pseudo Time since it actually controls the time stored in the Accumulator 52 against which the PE execution time will be measured.

The second Register 48 is also loaded during system initialization and is used by the operator to define the time frame of the Pseudo-Time window.

The third Register 50 is loaded by the PE itself at the completion of each macro instruction, and is used to store the amount of Pseudo Time which was required to execute a specific macro instruction, as determined by the PE's internal clock.

The differential Accumulator 52 is used to calculate the difference between the amount of Master Pseudo Time issued by the TAC 14 and the amount of Pseudo Time used by the PE 10 during the execution of a macro instruction in the following manner. First, the value stored in the Register 46 is added to the Accumulator 52 every time a TIC signal is issued by the TAC 14 and received by the LPA Control Circuit 56. Thus, if a value of 10 ns is stored in the Register 46, this value will be added to the Accumulator 52 every time a TIC signal is received to form an accumulated value representative of the Master Pseudo Time. Then, upon completion of the execution of every macro instruction, the value loaded in the Register 50, which is the time required for the execution of the instruction, is subtracted from the Accumulator 52.

The differential value in the Accumulator 52 resulting from the subtracting of the PE instruction execution time from the accumulated values from Register 46 is compared in the Comparator 58 to the time window stored in the Register 48. As shown in FIG. 3, the Comparator can be made by utilizing an absolute value comparison with one-half of the actual desired window size, thereby to account for positive and negative differentials. Of course, other window comparison techniques can be used. In any event, the value set in the Register 48, which is used for comprison, is effectively the maximum allowable differential between the outputs of the Registers 46 and 50.

This comparison in the Comparator 58 results in a flag being set if the PE 10 is ahead of Pseudo Time or behind Pseudo Time by an amount greater than that allowed by the time window setting. To be able to distinguish whether the PE is ahead or behind the Master Pseudo Time, it is necessary to note the sign of the differential between the outputs of the Registers 46 and 50. If the differential is positive, then the value accumulated in the Accumulator 52 is greater than the required execution time. Therefore, the PE 10 is behind Master Pseudo Time and can continue to its next instruction. On the other hand, if the differential is negative, then the execution time is greater than the accumulated Master Pseudo Time, and the PE is ahead of Master Pseudo Time. In this case, whether the PE can continue immediately to its next instruction depends on how much ahead it actually is, in comparison with the time window.

At the completion of executing a macro instruction, the PE can test these flags from the Comparator 58. If either flag is set, the PE must enter an idle state if the PE is too far ahead or continue execution if it is too far behind. In the latter case, a stop pulse is issued to the TAC 14 to stop the TIC signals until the PE can again move into the time window. If neither flag is present, the PE and the TAC 14 simply continue their normal operation.

An example of the operation of the time alignment control system according to the invention will now be described with reference to the timing diagram shown in FIG. 4. This timing diagram illustrates the relationship between the advance of master pseudo time, time increment control signal with respect to pseudo time, shown along the horizontal axis. Let it be initially assumed that the values set into register 46 for the TIC time value is one Msec. (I.E. each TIC corresponds to an advance of 1 Msec. along the pseudo time axis.) Then, when the operation is started, the contents of Accumulator 52 are advanced by a 1 Msec. value whenever TIC signal is received at the LPA Controller 56, as represented, for example, by the TIC arrows (1–10) along the Master Pseudo Time solid arrow line B at portion A of the 60 Msec. time frame shown in FIG. 4. In the meantime, the PE to which the particular LPA 16 is connected will begin executing a macro instruction, with a number of the elapsed pseudo time increments being represented by broken arrow line C in FIG. 4. When the macro instruction is complete, the advanced pseudo time total is stored in the Register 50. For the present example, it will be presumed that the contents of Register 50 have been advanced to a total of 60 Msec., as represented by the length (at tip F) of broken line arrow C, as shown in FIG. 4. In the meantime, let it be assumed that 45 TIC signals have been received from the TAC 14, as shown by the tip E of the solid line arrow B in FIG. 4. Therefore, since the reference TIC advance value stored in Register 46 is 1 Msec., a total value of 45 TICs or 45 Msec. has been accumulated in the Accumulator 58 during the time that the PE was executing the macro instruction and the contents of Register 50 were being advanced to a value of 60 Msec. In subtracting the 60 Msec. execution time from the 45 Msec. accumulated time, a minus sign 15 Msec. differential is noted, as presented by the double arrow (D=15 Msec.) in FIG. 4. As discussed above, this indicates that the PE (broken line arrow C) is 15 Msec. ahead of the Master Pseudo Time (solid line arrow B). I.e. tip F of broken line arrow C is 15 Msec. in advance of tip E of solid line arrow B.

Now, let it be assumed that the desired window is 20 Msec., as represented by the MPT time window W=20 Msec., shown in FIG. 4. Therefore, the value 10 Msec. is set into the half window size (W/2) Register 48. In comparing the absolute value (D=15 Msec.) from the Accumulator 52 with the (W/2=10 Msec.) one-half window size stored in Register 48, Comparator 58 will note that the PE is ahead of the window by an impermissible amount; i.e. $D > W/2$. Therefore, the PE will be instructed to enter an idle state until the continually accumulating value from the Register 46 (the tip E of solid line arrow B, which will continue to advance along the pseudo time axis as more TIC signals occur) reaches a point (in this example the 50 Msec. mark) where the comparator 58 will indicate that the PE, i.e. the tip F of broken line arrow C, falls within the window W. At that time the PE will again be allowed to resume operation and the tip E of solid line arrow B will again be permitted to advance at a rate of 1 Msec./TIC.

One other point to note in regard to FIG. 3 is that it is possible to instruct a PE 10 to enter an idle state where it will not affect the operation of other PE's in Master Pseudo Time. If this is desired, the LPA Controller 56 can be instructed to issue a clear command to the Accumulator 52. This sets the accumulator output at zero, where it will remain until the Control 56 is ordered to again set the accumulator for its differential operation. In this manner, a particular PE can "float" in Master Pseudo Time and be brought back in at any time without dropping far behind the other PE's while it remained in the idle state.

The time alignment system of this invention effects the PE's by forcing them to continuously start and stop as they move in and out of the pseudo-time window. This start/stop action is controlled by the combined effects of the pseudo-time window size, TIC value and the amount of pseudo time required to execute a macro instruction.

The window size can affect how long a PE remains in the time window and can continue executing macro instructions. A large time window provides the PE's with a large enough time frame to execute several macro instructions. A small time window will move ahead of the window after executing each macro instruction. When this occurs, the PE's must idle until pseudo time advances.

The TIC size affects the rate at which the time window advances in pseudo time. A large TIC size has the effect of jumping the time window forward in pseudo time. This results in PE's which are in the window or ahead of the window falling behind the window and halting the TAC 14. A small TIC size has the effect of allowing the PE's to almost always be ahead of the window. As the window slowly advances in pseudo time, a PE will fall into the window, execute a single macro instruction and move ahead of the window again.

The amount of pseudo time required to execute a macro instruction also affects how a PE moves with respect to the time window. An instruction which requires a large amount of psuedo time can jump a PE far ahead of the time window. An instruction which requires a small amount of pseudo time can drop a PE behind the time window.

The combined effects of the PE's either jumping far ahead or dropping far behind the window or the window jumping far ahead of the PE's requires the LPA to have a bit size large enough to prevent an overflow or underflow condition from occurring.

When the units of the pseudo time TICS are in nanoseconds, a 32 bit LPA can maintain a differential value between Master Pseudo Time and PE Pseudo Time of approximately ±4 seconds. With the window size defined to be in the microsecond and millisecond range, the LPA should be able to accommodate any macro instruction which requires a long period of pseudo time to be executed. An example of such an instruction is Z-80 CPU block move instructions. To move 64K bytes of memory with this instruction using a 2.5 MHz CPU requires approximately 0.5 seconds.

In regard to the above description, it should be noted that the PE's can be any processing elements capable of serving as emulators for other processors. Also, the control circuits in the TAC 14 and the LPA 16 are logic gate circuits for fulfilling the functions described for controlling accumulators, multiplexors, counters, registers, and other circuit elements to which they are connected in the manner described, and such logic circuits are well known in the art. Similarly, the other elements (e.g., the accumulators, registers, etc.) are all known elements which are readily available.

Although the above description has specifically been set forth for emulation processing elements, such a time alignment scheme could apply to other multiprocessor systems if such time alignment of operation was found to be desirable. Also, one could provide time alignment between a single processor and a time alignment controller using the principles of the present invention for purposes of aligning the processing element with an element other than another processing element.

Further, although a preferred embodiment has been shown for the TAC 14, it is to be understood that other generation schemes could be provided for generating TIC signals using a circuit configuration different than that shown in FIG. 2. Similarly, other configurations for comparing the Master Pseudo Time generated by the TAC 14 in comparision with a time window could be provided differing from the specific preferred embodiment of FIG. 3 while still falling within the principals of the present invention.

Finally, although particular values have been given by way of example for setting into the various registers, it is clear that any desired values can be used in such registers. In fact, one of the major benefits of this system, especially for emulation purposes, is the fact that these values can readily be changed for experimental and study purposes.

Accordingly, it is to be understood that the above-identified arrangements are simply illustrative of the application of the principals of this invention. Numerous other arrangements may be readily devised by those skilled in the art which embody the principals of the present invention and fall within its spirit and scope.

We claim:

1. A time alignment control system for aligning a plurality of processors in a multiprocessor system comprising:
   first means for generating a pseudo time reference;
   second means, coupled to said first means, for establishing a respective time window for each processor which time window is based on the master pseudo time reference generated by said master pseudo time generating means to which each processor is coupled;
   third means at each processor coupled to said second means for determining whether the time required for each processor to execute an instruction is within said time window, ahead of said time window, or behind said time window;
   fourth means, at each processor and coupled to said third means, for idling a processor until the time window catches up with said processor if said processor is ahead of the time window; and fifth means, at each processor and coupled to said third means, for stopping the master pseudo time generating means if any processor is behind said time window until said processor enters said time window.

2. A system for determining whether a processor is synchronized to a master pseudo time reference established by a master pseudo time generator coupled to said processor which master pseudo time generator provides time increment control signals to said processor each time an increment of master pseudo time has occurred, comprising;

first means at each processor for receiving said time increment control signal and for forming a local pseudo time reference in accordance with said time increment control signals with said local pseudo time reference being based on said master pseudo time reference;

second means, at said processor, for determining the amount of time required for the processor to execute an instruction; and third means, at said processor and coupled to said first and second means, for determining the difference between the local pseudo time reference and the processor instruction execution time to produce a time difference signal which indicates the amount by which said processor is out of time alignment with said local pseudo time reference.

3. A system for synchronizing a processor with a master pseudo time generator which establishes a master pseudo time reference and which issues time increment control signals to said processor each time an increment of master pseudo time occurs comprising:

first means at said processor for receiving said time increment control signal and for forming a local pseudo time reference in accordance with said time increment control signals with said local pseudo time reference being based on said master pseudo time reference;

second means at said processor for determining the amount of time required for the processor to execute an instruction;

third means, at said processor and coupled to said first and second means, for determining the difference between the local pseudo time reference and the processor instruction execution time to produce a time difference signal which indicates the amount by which said processor is out of time alignment with said local pseudo time reference;

fourth mean, at said processor and coupled to said third means, for comparing the time difference signal with a time window to determine if said time difference signal is within said time window, ahead of said time window, or behind said time window; and fifth means, at said processor and coupled to said fourth means, for issuing a stop signal to said master pseudo time generator if the comparision means indicates that the time difference signal is behind said time window, and means for issuing a stop signal to the processor if the comparision means indicates that said time difference signal is ahead of said time window.

4. A time alignment system for maintaining time alignment between a plurality of processors in a multiprocessor system comprising:

a time alignment controller for establishing a master pseudo time reference and providing time increment control signals to each of said processors each time an increment of master pseudo time has occurred; and a respective pseudo time accumulator coupled to each processor receiving said time increment control signals from said time alignment controller comprising:

first means for receiving said time increment control signal and for forming a local pseudo time reference in accordance with said time increment control signals with said local pseudo time reference being based on said master pseudo time reference;

second means for determining the amount of time required for the processor to execute an instruction;

third means, coupled to said first and second means, for determining the difference between the local pseudo time reference and the processor instruction execution time to product a time difference signal which indicates the amount by which said processor is out of time alignment with said local psuedo time reference;

fourth means, coupled to said third means, for comparing the time difference signal with a time window to determine if said time difference signal is within said time window, ahead of said time window, or behind said time window; and fifth means, coupled to said fourth means, for issuing a stop signal to said time alignment controller if said comparator indicates that the time difference signal is behind said time window, and means for issuing a stop signal to said processor if said comparator means indicates that the time difference signal is ahead of said time window.

5. A system according to claim 4, wherein the time alignment controller comprises:

means for generating the time increment control signals;

a master pseudo time accumulator coupled to said time increment control generating means for accumulating all time increment control signals to maintain the master pseudo time reference;

control means coupled to said master pseudo time accumulator for controlling the accumulation of the time increment control signals by said master pseudo time accumulator;

means coupled to said master pseudo time accumulator for sending time increment control signals to the local pseudo time accumulator; and means coupled to said controller for receiving stop signals from said local pseudo time accumulator for stopping generation of the time increment control signals in response to said stop signal.

6. A system according to claim 5, wherein the means for generating a time increment control signal comprises:

a clock coupled to said control means;

a counter coupled to said clock for providing first and second outputs representative of different counter stages of said counter; and a multiplexer coupled to said controller and coupled between said counter and said master pseudo time accumulator, wherein said multiplexer controls which of said counter outputs is passed to said accumulator in accordance with control signals provided by said controller.

7. A system according to claim 5, further including mode control means coupled to said controller for controlling the rate of generation of said time increment control signals.

8. A system according to claim 7 wherein said mode control means includes means for generating time increment control signals in a burst mode by generating a predetermined number of time increment control signals and then stopping.

9. A system according to claim 8, wherein the predetermined number of time increment control signals is one.

10. A system according to claim 4, wherein the local pseudo time accumulator comprises:
   an accumulator;
   a first register for storing a predetermined time period;
   a second register for receiving and storing an amount of time which the processor to which the local pseudo time accumulator is coupled requires to perform an instruction; and
   control means for adding the contents of the first register to the accumulator each time a time increment control signal is received by said local pseudo time accumulator and for subtracting the value stored in the second register from the accumulator when the processor has completed execution of an instruction so that the accumulator can produce the time difference signal indicating the amount by which the processor is out of alignment with said local pseudo time.

11. A system according to claim 10, wherein the local pseudo time accumulator further comprises;
   a third register for storing a value corresponding to a desired time window; and
   a comparator coupled to the third register and the output of the accumulator for comparing the time difference signal with the value stored in the third register.

12. A system according to claim 10, further comprising a multiplexer coupled to the control means and located between the accumulator and the first and second registers for controlling the input of the value stored in the first and second registers to the accumulator in accordance with command signals from the control means.

13. A multiple micro-processor emulation system comprising:
   a plurality of emulation processors coupled together to model a multiprocessor system, wherein each of said emulation processors in programmable to emulate another processor; and
   time alignment control means for maintaining time alignment between each of said emulation processors comprising:
   first means for generating a master time reference;
   second means for establishing a time window for each emulation processor which time window is based on a master pseudo time reference generated by said master pseudo time generating means to which emulation processor is coupled;
   third means at each emulation processor and coupled to said second means for determining whether the time required for each emulation processor to execute an instruction is within said time window, ahead of said time window, or behind said time window;
   fourth means, coupled to said third means, for idling an emulation processor until the time window catches up with said emulation processor if said emulation processor ahead of the time window;
   fifth means, coupled to said third means, for stopping the master pseudo time generating means if any emulation processor is behind said time window until said emulation processor enters said time window.

14. A multiple microprocessor emulating system comprising:
   a plurality of emulation processors coupled together to model a multiprocessor system wherein each of said emulation processors is programmable to emulate another processor; and
   time alignment control means for maintaining time alignment between each of said emulation processors comprising:
   a time alignment controller for establishing a master pseudo time reference and providing time increment control signals to each of said emulation processors each time an increment of master pseudo time has occured; and
   a respective local pseudo time accumulator coupled to each emulation processor for receiving said time increment control signals from said time alignment controller comprising:
   means for receiving said time increment control signal and for forming a local pseudo time reference in accordance with said time increment control signals with said local pseudo time reference being based on said master pseudo time reference;
   means for determining the amount of time required for the emulation processor to execute an instruction;
   means for determining the difference between the local pseudo time reference and the emulation processor instruction execution time to produce a time difference signal which indicates the amount by which said emulation processor is out of alignment with said local pseudo time reference;
   means for comparing the time difference signal with a time window to determine if said time difference signal is within said time window, ahead of said time window, or behind said time window; and
   means for issuing a stop signal to said time alignment controller if said comparator indicates that the time difference signal is behind said time window, and means for issuing a stop signal to said emulation processor if said comparator means indicates that the time difference signal is ahead of said time window.

15. A method for time aligning a plurality of processors in a multiprocessor system comprising:
   establishing a time window for each processor, which time window is based on and advanced by a master pseudo time reference generated by a master pseudo time generator to which each processor is coupled;
   determining for each processor whether a time required for the processor to execute an instruction is within said time window, ahead of said time window, or behind said time window;
   idling processor until the time window catches up with said processor if said processor is ahead of the time window; and stopping the master pseudo time generator if any processor is behind said time window until said processor enters enters said time window.

16. A method for determining whether a processor is synchronized to a master pseudo time reference established by a master pseudo time generator coupled to said processor which master pseudo time generator provides time increment control signals to said processor each time an increment of master pseudo time has occured, comprising:

receiving said time increment control signal at said processor and forming a local pseudo time reference at said processor in accordance with said time increment control signals with said local pseudo time reference being based on said master pseudo time reference.

determining the amount of time required for the processor to execute an instruction; and determining the difference between the local pseudo time reference and the processor instruction execution time to produce a time difference signal which indicates the amount by which said processor is out of time alignment with said local pseudo time reference.

17. A method for synchronizing a processor with a master pseudo time generator which establishes a master pseudo time reference and which issues time increment control signals to said processor each time an increment of master pseudo time occurs comprising:

receiving said time increment control signal at said processor and forming a local pseudo time reference at said processor in accordance with said time increment control signals with said local pseudo time reference being based on said master pseudo time reference;

determining the amount of time required for the processor to execute an instruction;

determining the difference between the local pseudo time reference and the processor instruction execution time to produce a time difference signal which indicates the amount by which said procesor is out of time alignment with said local pseudo time reference;

comparing the time difference signal with a time window to determine if said time difference signal is within said time window, ahead of said time window, or behind said time window, and issuing a stop signal to said master pseudo time generator if the comparison means indicates that the time difference signal is behind said time window, and issuing a stop signal to the processor if the comparison means indicates that said time difference signal is ahead of said time window.

18. A time alignment method for maintaining time alignment between a plurality of processors in a multiprocessor system comprising: establishing a master pseudo time reference and providing time increment control signals to each of said processors each time an increment of master pseudo time has occurred;

receiving said time increment control signals at said processor from said time alignment controller and forming a local pseudo time reference in accordance with said time increment control signals with said local pseudo time reference being based on said master pseudo time reference;

determining the amount of time required for the processor to execute an instruction;

determining the difference between the local pseudo time reference and the processor instruction execution time to produce a time difference signal which indicates the amount by which said processor is out of time alignment with said local pseudo time reference;

comparing the time difference signal with a time window to determine if said time difference signal is within said time window, ahead of said time window, or behind said time window; and issuing a stop signal to stop the time increment control signals if said comparator indicates that the time difference signal is behind said time window, and issuing a stop signal to said processor if said comparator means indicates that the time difference signal is ahead of said time window.

19. A multiprocessor emulation method comprising:

coupling a plurality of emulation processors together to model a multiprocessor system, wherein each of said emulation processors is programmable to emulate another processor; and maintaining time alignment between each of said emulation processors by the steps of:

establishing a time window in each emulation processor, which time window is based on and advanced by a master pseudo time reference generated by a master pseudo time generator to which each emulation processor is coupled;

determining for each emulation processor whether a time required for the emulation processor to execute an instruction is within said time window, ahead of said time window, or behind said time window;

idling an emulation processor until the time window catches up with said emulation processor if said emulation processor is ahead of the time window; and stopping the master pseudo time generator if any emulation processor is behind said time window until said emulation processor enters said time window.

20. A multiprocesor emulating method comprising:

coupling a plurality of emulation processors together to model a multiprocessor system wherein each of said emulation processors is programmable to emulate another processor; and maintaining time alignment between each of said emulation processors by the steps of:

establishing a master pseudo time reference and providing time increment control signals to each of said emulation processors each time an increment of master pseudo time has occurred;

receiving said time increment control signals from said time alignment controller at each emulation processor;

forming a local pseudo time reference for each emulation processor in accordance with said time increment control signals with said local pseudo time reference being based on said master pseudo time reference;

determining for each emulation processor the amount of time required for the emulation processor to execute an instruction;

determining for each emulation processor the difference between the local pseudo time reference and the emulation processor instruction execution time to produce a time difference signal which indicates the amount by which said emulation processor is out of time alignment with said local pseudo time reference;

comparing the time difference signal with a time window for each emulator processor to determine if said time difference signal is within said time window, ahead of said time window, or behind said time window; and issuing a stop signal to stop the time increment control signals if said comparator indicates that the time difference signal for any emulation processor is behind said time window, and issuing a stop signal to an emulation processor if said comparator means indicates that the time difference signal for the emulation processor is ahead of said time window.

21. A system according to claim 14, wherein the time alignment controller comprises:

means for generating the time increment control signals;

a master pseudo time accumulator coupled to said time increment control generating means for accumulating all time increment control signals to maintain the master pseudo time reference;

control means coupled to said master pseudo time accumulator for controlling the accumulation of time increment control signals by said master pseudo time accumulator;

means coupled to said master pseudo time accumulator sending time increment control signals to the local pseudo time accumulator; and means coupled to said controlled for receiving stop signals from said local pseudo time accumulator for stopping generation of time increment control signals in response to said stop signal.

22. A system according to claim 14, wherein the local pseudo time accumulator comprises:

an accumulator;

a first register for storing a predetermined time period;

a second register for receiving and storing an amount of time which the processor to which the local pseudo time accumulator is coupled requires to perform an instruction; and control means for adding the contents of the first register to the accumulator each time a time increment control signal is received by said local pseudo time accumulator and for subtracting the value stored in the second register from the accumulator when the processor has completed execution of an instruction so that the accumulator can produce the time difference signal indicating the amount by which the processor is out of alignment with said local pseudo time.

* * * * *